United States Patent [19]

Bachar

[11] Patent Number: 5,331,439
[45] Date of Patent: Jul. 19, 1994

[54] APPARATUS AND METHOD FOR COLOR TRANSFORMATION

[75] Inventor: Avraham Bachar, Petach Tikya, Israel

[73] Assignee: Scitex Corporation Ltd., Herzliya, Israel

[21] Appl. No.: 18,862

[22] Filed: Feb. 17, 1993

[30] Foreign Application Priority Data

Mar. 10, 1992 [IL] Israel ................................. 101197

[51] Int. Cl.⁵ ............................................. H04N 1/46
[52] U.S. Cl. ................................. 358/500; 358/520; 358/522; 358/523; 358/524; 358/525
[58] Field of Search ................ 358/500, 501, 518, 520, 358/522, 523, 524, 525; H04N 1/46

[56] References Cited

U.S. PATENT DOCUMENTS

| 4,839,721 | 6/1989 | Abdulwahab et al. | 358/80 |
| 4,941,039 | 7/1990 | E'Errico | 358/80 |
| 4,992,861 | 2/1991 | D'Errico | 358/75 |

FOREIGN PATENT DOCUMENTS

| 0366309 | 5/1990 | European Pat. Off. | H04N 1/46 |
| 487304A2 | 5/1992 | European Pat. Off. | H04N 1/46 |
| 61-60068 | 3/1986 | Japan | H04N 1/40 |
| 2260669A | 4/1993 | United Kingdom | H04N 1/46 |

Primary Examiner—Mark R. Powell
Assistant Examiner—Jerome Grant, II
Attorney, Agent, or Firm—Ladas & Parry

[57] ABSTRACT

Color transformation apparatus for transforming an input color space into an output color space and including a first LUT for transforming a first portion of the input color space into a corresponding first portion of the output color space, a second LUT for transforming a second portion of the input color space into a corresponding second portion of the output color space, and a control unit for channeling input values included in the first and second portions of the color space to the first and second LUTs respectively.

7 Claims, 3 Drawing Sheets

APPARATUS AND METHOD FOR COLOR TRANSFORMATION

FIELD OF THE INVENTION

The present invention relates to look-up tables.

BACKGROUND OF THE INVENTION

A well known technique for digital data transformation is to employ the digital data to be transformed as an address to a look up table (LUT) or electronic memory storing a transformation of the digital data to be transformed. Each combination of bits specifies a single location in memory which stores the transformation of the data element corresponding to that combination of bits. LUTs are used in many types of applications such as in color image processing in color pre-press situations.

Memory volume requirements for LUTs are determined by the number of combinations of bits of the input data, as well as by the depth of representation. In color transformation applications, in which a color space may include $2^{24}$ colors, or more than 16 million colors, a memory having more than 16 million entries or cells may be required, as shown in prior art FIG. 1. This volume of memory is expensive. Also, loading and modification processes become extremely time consuming.

Techniques for reducing memory size are known. These techniques result in a reduction of transformation accuracy to a greater or lesser extent. One such technique, as illustrated in prior art FIG. 2, is to provide only a small number of memory cells corresponding to only a small fraction of the possible input values, such as only 4096 memory cells instead of providing more than 16 million memory cells. Output values for all remaining possible input values, to which no memory cell is assigned, are computed by interpolation or extrapolation based on the distances of an individual input value from the cell addresses which are closest to the individual input value.

A LUT in which the number of possible input values which have a memory cell assigned to them is only a small fraction of the total number of possible input values is also termed herein a "low resolution" LUT.

According to this technique, the majority of transformations are not derived directly from the LUT, since the majority of input values to be transformed do not address any of the memory cells of the LUT. Instead, transformed data for these input values is computed by interpolation from the contents of adjacent memory cells. The factor of gain in memory volume and in loading time is equal to the factor of loss of transformation resolution.

One disadvantage of this method is that LUTs are often employed to represent non-linear transformations in which output values whose addresses fall intermediate a plurality of LUT cells are not linear combinations of the contents of those LUT cells. For these transformations, the results of linear interpolation procedures are normally inaccurate. Furthermore, the inaccuracies introduced by the interpolation process are normally not uniform across the data space to be transformed, but vary thereacross.

For example, for some color spaces, the nonuniformity of the inaccuracies introduced by standard color transformation interpolation processes is such that dark colors are distorted because they are transformed with substantial inaccuracy. Colors which are distorted substantially when they are transformed by interpolation are believed to be colors for which the perception of the human eye is non-linear relative to the actual physical properties of the colors perceived.

U.S. Pat. Nos. 4,941,029 and 4,992,861, both to D'Errico, disclose a technique for reducing memory size which is described as causing relatively little reduction of transformation accuracy. D'Errico provides a method for employing a LUT for interpolation purposes in which an interpolation algorithm with special features is employed.

Published European Application 0366309 to IBM describes a color image quantization system in which color data representative of an input color space of a picture is loaded into a single LUT. The representative data is determined by repeated division of the input color space of the picture into K child-spaces, where K is the number of cells in the LUT. The order of division is dependent upon the distribution of original image pels within the existing child-spaces. Eventually, the distribution of pels within the child-spaces is nearly uniform, thereby maintaining image quality for images having a given distribution of pels within the input color space.

The criterion according to which the IBM method operates is an image-specific criterion whereby precedence is given to color subspaces which are densely populated with image pels. The method is not operative to give precedence to color subspaces in which the non-linearity of the color transformation is particularly pronounced.

Also, the LUT disclosed in the above-referenced IBM document is addressed by nominal index values assigned to each pel rather than by the actual color of each pel. Consequently, it is impossible to carry out a meaningful interpolation process.

The eventual set of child-spaces defined by the IBM method typically includes child-spaces of different sizes. For example, FIG. 5 of the above-referenced IBM document is a conceptual diagram of a divided color-space management list. As shown, the eventual set of child-spaces in FIG. 5 includes 7 child-spaces on level 1, 7 child-spaces on level 2 and 7 child-spaces on level 3. The size of the child-spaces on levels 1, 2 and 3 are $\frac{1}{8}$, $1/(8 \times 8)$ and $1/(8 \times 8 \times 8)$ respectively.

SUMMARY OF THE INVENTION

The present invention seeks to provide a color transformation apparatus and technique which require relatively little memory but which result in relatively high transformation accuracy.

The apparatus and methods of the present invention are useful in any color transformation application, such as color reading, color writing, digital color modification, and combinations of these, where color reading is defined as transforming an analog representation of a color image into a digital representation thereof, color writing is defined as transforming a digital representation of a color image into an analog representation thereof and digital color modification is defined as modifying a first digital representation of a color image, thereby to obtain a second digital representation of a color image, with or without use of a real-time display screen.

In the present discussion, the term "color image" is not intended to exclude images which are gradations of a single tone such as black and white images, and the following definitions are employed:

Analog representation of a color image: A representation of a color image which resembles or is analogous to the color image itself or which is perceivable by the human eye as a color image. The representation may appear upon any substrate such as a transparency, photograph, CRT display, or printed page.

Digital representation of a color image: A representation of a color image which is expressed in discrete symbols such as numerical symbols. For example, a digital file including a plurality of numerical values corresponding to a plurality of pixels into which the color image has been divided, each such numerical value representing some aspect pertaining to the colored appearance of the corresponding pixel.

According to the technique of the present invention, an input data space is partitioned into a plurality of input data subspaces which are normally not of equal size. The input data in each of the plurality of subspaces addresses a corresponding one of a plurality of LUTs which may be of equal size but typically are not of equal resolution. In other words, the ratio of the size of each LUT to the size of the input data subspace which it is operative to transform varies over the plurality of LUTs.

A particular advantage of this method is that input values, such as bright colors, which are relatively insensitive to interpolation error may be grouped in large subspaces whereas input values, such as dark colors, which are relatively sensitive to interpolation error may be grouped in small subspaces. This grouping provides high resolution transformation apparatus for sensitive input data subspaces and highly compact transformation apparatus for non-sensitive input data subspaces. The subspaces need not be vector spaces in the mathematical sense.

There is thus provided in accordance with a preferred embodiment of the present invention color transformation apparatus for transforming an input color space into an output color space and including a first LUT for transforming a first portion of the input color space into a corresponding first portion of the output color space, a second LUT for transforming a second portion of the input color space into a corresponding second portion of the output color space, and a control unit for channeling input values included in the first and second portions of the color space to the first and second LUTs respectively.

Further in accordance with a preferred embodiment of the present invention, the ratio between the number of memory cells in the first LUT and the number of possible input values channeled thereto differs from the corresponding ratio for the second LUT.

Still further in accordance with a preferred embodiment of the present invention, the input color space also includes at least one more portion thereof and the color transformation apparatus also includes at least one more LUT for transforming a corresponding one of the at least one more portions of the input color space into a corresponding portion of the output color space, the control unit also being operative to channel input values included in each of the at least one more portions of the input color space to a corresponding one of the at least one more LUTs.

There is also provided in accordance with a preferred embodiment of the present invention a color transformation method for operating a color transformation on an input color space, thereby to transform the input color space into an output color space, including the steps of defining first and second portions of the input color space, channeling input values included in the first and second portions of the input color space, respectively, to first and second LUTs respectively, employing the first LUT to transform the first portion of the input color space into a corresponding first portion of the output color space, and employing the second LUT to transform the second portion of the input color space into a corresponding second portion of the output color space.

Further in accordance with a preferred embodiment of the present invention, the step of employing a first LUT includes the step of employing a first interpolation algorithm to interpolate from the first LUT, thereby to compute an output value corresponding to an input value within the first portion of the color space which does not appear in the first LUT.

Still further in accordance with a preferred embodiment of the present invention, the step of employing a second LUT includes the step of employing a second interpolation algorithm to interpolate from the second LUT, thereby to compute an output value corresponding to an input value within the second portion of the color space which does not appear in the second LUT, and the first interpolation algorithm is not the same as the second interpolation algorithm.

Additionally in accordance with a preferred embodiment of the present invention, the first and second portions of the input color space are defined independently of any particular set of input values within the input color space.

There is also provided in accordance with yet a further preferred embodiment of the present invention color transformation apparatus for transforming an input color space into an output color space and including a first LUT for transforming a first portion of the input color space into a corresponding first portion of the output color space, and at least one additional LUT for transforming corresponding at least one additional portions of the input color space into corresponding at least one portions of the output color space, each of the first and at least one additional LUTs including a plurality of memory cells, thereby defining at least two pluralities of memory cells, such that, for each LUT, each individual memory cell represents a subportion of the input color space, thereby to define a plurality of subportions corresponding to each LUT, wherein, for each LUT, the plurality of subportions are of uniform size.

Further in accordance with a preferred embodiment of the present invention, the color transformation apparatus also includes a control unit for receiving input values of the input color space and for channeling input values included in an individual one of the first and at least one additional portions of the input space, respectively, to a corresponding one of the first and at least one additional LUTs, respectively.

Still further in accordance with a preferred embodiment of the present invention, the at least two pluralities of memory cells are not equal in number.

Additionally in accordance with a preferred embodiment of the present invention, the first portion of the input color space includes the entire input color space.

Still further in accordance with a preferred embodiment of the present invention, the first and second portions of the input color space are defined irrespective of the distribution of any particular set of input values within the input color space.

Additionally in accordance with a preferred embodiment of the present invention, at least one of the first and second portions of the input color space includes color values in close proximity over which the transformation varies substantially, and/or memorial colors.

Still further in accordance with a preferred embodiment of the present invention, the input color space portions corresponding to all but one of the LUTs include color values in close proximity over which the transformation varies substantially, and/or memorial colors.

BRIEF DESCRIPTION OF THE DRAWINGS

The present invention will be understood and appreciated from the following detailed description, taken in conjunction with the drawings in which.

DETAILED DESCRIPTION OF PREFERRED EMBODIMENTS

Figure 1:
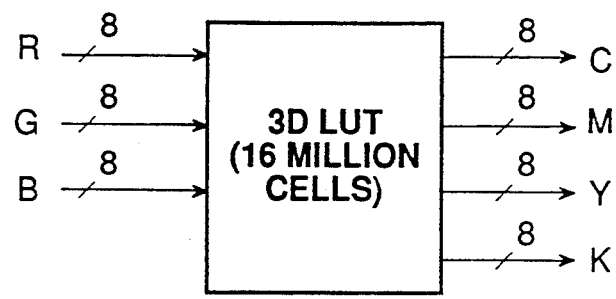
FIG. 1 is a diagram of a prior art LUT having 16 million cells and being operative to transform three dimensional 8 bit depth color values into four dimensional 8 bit depth color values.
Figure 2:
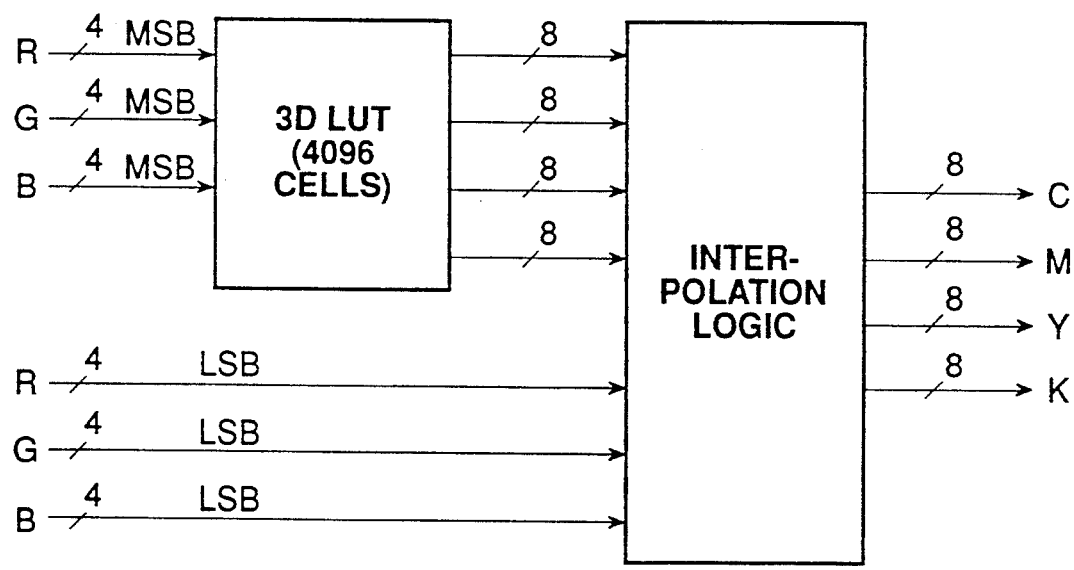
FIG. 2 is a diagram of a prior art LUT having 4096 cells and being operative to transform 4096 three dimensional 8 bit depth members of a color space into four dimensional 8 bit depth color values, the remaining members of the color space being transformed by an interpolation logic unit associated with the LUT.
Figure 3:
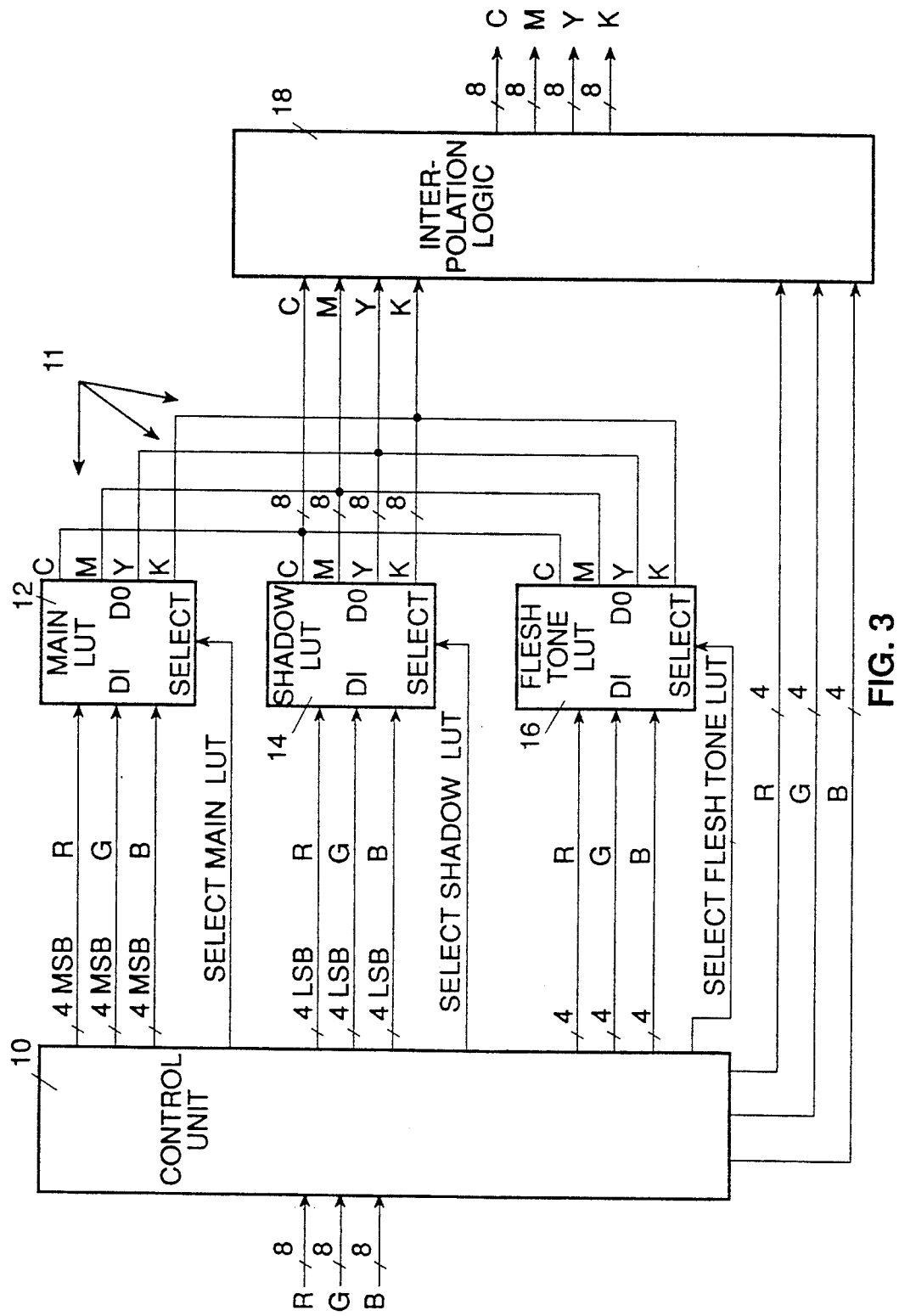
FIG. 3 is a block diagram of color transformation apparatus constructed and operative in accordance with a preferred embodiment of the present invention.

Reference is now made to FIG. 3 which is a block diagram of color transformation apparatus constructed and operative in accordance with a preferred embodiment of the present invention. The color transformation apparatus of FIG. 3 is operative to transform 3 dimensional input values into 4 dimensional output values, where each dimension of the input data and of the output data is represented in 8 bit depth. However, it is appreciated that, more generally, the present invention is applicable to transform n dimensional input values into m dimensional output values for any n and m, and each dimension of the input data and of the output data may be represented in any suitable depth.

The input data may be represented in any suitable coordinate system, such as but not limited to RGB, CMY and LAB. The output data may also be represented in any suitable coordinate system, such as but not limited to CMYK, LAB, XYZ and CMY.

The color transformation apparatus of FIG. 3 includes a control unit 10 which receives 3 dimensional 8-bit depth input data and a plurality 11 of or-connected LUT units, which output 4 dimensional 8-bit depth output data. Control unit 10 typically transmits some of the bits of the input data to a selected LUT from among the plurality of LUTs.

In the present example, the plurality 11 of LUTs includes three LUTs, namely, main LUT unit 12, shadow LUT unit 14 and flesh-tone LUT unit 16, however, any suitable number of LUTs may be provided, such as four or more LUTs. In the present example, each of the three LUTs is addressed by three 4-bit components. For example, the main LUT 12 is addressed by the 4 MSB's and the shadow LUT 14 is addressed by the 4 LSB's. It is appreciated that any suitable subset of the bits which define the input value to control unit 10 may be used to address each LUT. In other words, in the present example, each of the three LUTs has $2^{12} = 4096$ cells. However, this need not be the case. Each of the LUTs may be of any suitable size and the three LUTs may be of different sizes.

Each LUT apart from the main LUT unit 12 is operative to transform a predetermined subset of input values into output values at a predetermined resolution which is higher than the resolution at which main LUT unit 12 operates. In the illustrated embodiment, there are two predetermined subsets of input values, shadow input values and flesh-tone input values. It is appreciated, however, that a LUT may be provided for any suitable subset of input values which it is desired to transform at a relatively high resolution. Such subsets preferably include color values in close proximity over which the transformation varies substantially and/or memorial colors. The term "memorial colors" refers to colors for which the user has a well-defined expectation of what their appearance should be, such as flesh color, grass color and sky color.

The control unit 10 determines which bits of each 24-bit input value address each dimension of each LUT. For example, in the illustrated embodiment, the 4 MSB's of each dimension of each input value are employed to address the corresponding dimension of the main LUT 12. The 4 LSB's of each dimension of each input value are employed to address the corresponding dimension of the shadow LUT 14. The remaining 4 bits, which are the 4 MSB's in this case, need not be employed because the 4 MSB's are 0000 for all shadow input values.

The control unit 10 also determines which LUT will be activated. In the illustrated example, shadow or dark input data is channeled by control unit 10 to shadow LUT 14. By activating the "select shadow LUT" line between control unit 10 and shadow LUT 14, control unit 10 channels the output data from LUT 14 to interpolation unit 18. Input data in flesh tones is channeled by control unit 10 to flesh tone LUT 16. By activating the "select flesh tone LUT" line connecting control unit 10 and flesh tone LUT 16, control unit 10 channels the output data from LUT 16 to interpolation unit 18. All other input data, in other words, all input colors which are neither dark nor flesh tone, are channeled by control unit 10 to main LUT 12. By activating the "select main LUT" line connecting control unit 10 and main LUT 12, control unit 10 channels the output data from main LUT 12 to interpolation unit 18.

Control unit 10 may be implemented using any suitable systems such as logic gates, PALs or FPGAs such as those manufactured by Altera or Xilinx.

The apparatus of FIG. 3 also includes an interpolation logic unit 18 which receives output from a selected one of LUTs 12, 14 and 16 as well as directly from control unit 10. The input to interpolation logic unit 18 which arrives directly from control unit 10 is employed to interpolate within a cell defined by the signal received from the selected one of LUTs 12, 14 and 16.

Control unit 10 is operative to send the bits which are not used to address the selected one of LUTs 12, 14 and 16, directly to interpolation logic unit 18. In the illustrated example, if the selected LUT is main LUT 12, then the 4 MSB's are sent to main LUT 12 and therefore control unit 10 provides the 4 LSB's directly to interpolation logic unit 18.

Figure 4:
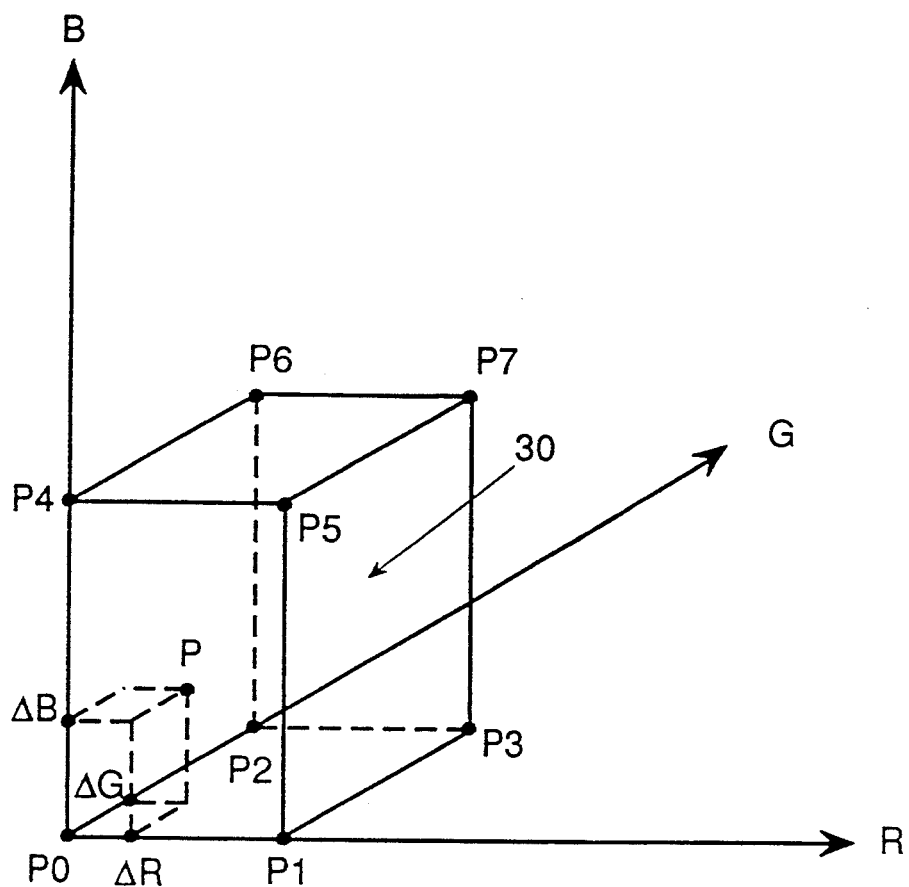
FIG. 4 is a diagram illustrating a method for transforming by interpolation a point in a first color space into a value in a second color space.

Reference is now made to FIG. 4 which illustrates a method which enables interpolation logic unit 18 to employ the input from control unit 10 in order to transform, by interpolation, a point P which lies within a cell 30 delimited by eight vertices P0, P1, P2, P3, P4, P5, P6 and P7. The eight vertex values are received by interpolation logic unit 18 from the selected LUT. The input to interpolation logic unit 18 from control unit 10 provides an indication of the distances of point P from each of the three coordinate axes, which are the R, G and B axes in the present example. The distances of point P from the R, G, and B axes are indicated in FIG. 4 as delta-R, delta-G and delta-B, respectively. FIG. 4 illustrates a preferred formula for computing a transformed value T(P) as a function of the transformed values T(P0), T(P1), T(P2), T(P3), T(P4), T(P5), T(P6) and T(P7) of vertices P0, P1, P2, P3, P4, P5, P6 and P7 respectively.

Interpolation logic unit 18 may be implemented using suitable means including a suitable combination of multipliers and accumulators.

It is appreciated that although the illustrated embodiment involves a method and apparatus for transforming an input color space into an output color space, in fact, the present invention is not limited to color image processing applications and may be useful in a wide variety of data processing applications in which a transformation is operated on input data, thereby to provide output data.

It will be appreciated by persons skilled in the art that the present invention is not limited to what has been particularly shown and described hereinabove. Rather, the scope of the present invention is defined only by the claims that follow.

I claim:

1. A color transformation method for operating a color transformation on an input color space, thereby to transform the color space into an output color space and comprising the steps of:

channeling input values included in the first and second portions of the input color space, respectively, to first and second LUTs respectively;

employing the first LUT to transform the first portion of the input color space into a corresponding first portion of the output color space; and employing the second LUT to transform the second portion of the input color space into a corresponding second portion of the output color space.

wherein the step of employing a first LUT comprises the step of employing a first interpolation algorithm to interpolate from the first LUT, thereby to compute an output value corresponding to an input value within the first portion of the color space which does not appear in the first LUT.

2. A method according to claim 1 wherein the step of employing a second LUT comprises the step of employing a second interpolation algorithm to interpolate from the second LUT, thereby to compute an output value corresponding to an input value within the second portion of the color space which does not appear in the second LUT, and the first interpolation algorithm is not the same as the second interpolation algorithm.

3. A method according to claim 1 wherein the first and second portions of the input color space are defined independently of any particular set of input values within the input color space.

4. Color transformation apparatus for transforming an input color space into an output color space and comprising:

a first LUT for transforming a first portion of the input color space into a corresponding first portion of the output color space; and at least one additional LUT for transforming corresponding at least one additional portions of the input color space into corresponding at least one portions of the output color space, wherein each of the first and at least one additional LUTs includes a plurality of memory cells, thereby defining at least two pluralities of memory cells, and wherein, for each LUT, each individual memory cell represents a subportion of the input color space, thereby to define a plurality of subportions corresponding to each LUT, and wherein, for each LUT, the plurality of subportions are uniform size.

5. Apparatus according to claim 4 wherein the first portion of the input color space comprises the entire input color space.

6. Apparatus according to claim 4 and also comprising a control unit for receiving input values of the input color space and channeling input values included in an individual one of the first and at least one additional portions of the input space, respectively, to a corresponding one of the first and at least one additional LUTs, respectively.

7. Apparatus according to claim 6 wherein the at least two pluralities of memory cells are not equal in number.

* * * * *